(12) United States Patent
Edland

(10) Patent No.: US 7,730,812 B2
(45) Date of Patent: Jun. 8, 2010

(54) SCREW HEAD AND TOOL FOR USE THEREWITH

(76) Inventor: Jone Edland, Ekravn. 65C, N-0757, Oslo (NO)

( * ) Notice: Subject to any disclaimer, the term of this patent is extended or adjusted under 35 U.S.C. 154(b) by 0 days.

(21) Appl. No.: 11/979,731

(22) Filed: Nov. 7, 2007

(65) Prior Publication Data

US 2008/0159827 A1 Jul. 3, 2008

Related U.S. Application Data

(63) Continuation of application No. 11/471,551, filed on Jun. 21, 2006, now abandoned.

(30) Foreign Application Priority Data

Apr. 24, 2006 (GB) ................................ 0608062.6

(51) Int. Cl.
*B25B 15/00* (2006.01)
*B25B 23/00* (2006.01)
(52) U.S. Cl. ..................... 81/460; 81/436; 411/404; 411/919
(58) Field of Classification Search ............... 81/460, 81/436, 451, 461, 121.1; 411/403–405, 410, 411/919
See application file for complete search history.

(56) References Cited

U.S. PATENT DOCUMENTS

| | | |
|---|---|---|
| 975,285 A | 11/1910 | Robertson |
| 1,797,390 A | 3/1931 | Wood |
| 2,083,092 A | 6/1937 | Richer |
| 2,216,382 A | 10/1940 | West et al. |
| 2,397,216 A | 3/1946 | Stellin |
| 2,800,829 A | 7/1957 | West |
| 2,800,936 A | 7/1957 | West |
| 3,207,196 A | 9/1965 | Stillwagon, Jr. |

(Continued)

FOREIGN PATENT DOCUMENTS

AT          195189         1/1958

(Continued)

OTHER PUBLICATIONS

European Search Report PCT/N02006/000402, Feb. 2007.

(Continued)

*Primary Examiner*—D. S Meislin
(74) *Attorney, Agent, or Firm*—Finnegan, Henderson, Farabow, Garrett & Dunner, L.L.P.

(57) ABSTRACT

The invention provides a screw head having a hexalobular slot (2) in the upper surface of the screw head, an upper peripheral wall (9) of hexalobular planform extending down into the screw head, the upper peripheral wall (9) being parallel or near parallel to the axis of the screw, a sloping transition surface (15) extending downwardly and inwardly with respect to the lower edge of the upper peripheral wall (9), and a tapered recess (11) extending downwardly from the lower edge of the sloping transition surface (15), in which the dimensions of the screw head are such that when the screw head is engaged by a tool (6) having upper (16) and lower engagement (17) sections, the lower engagement section (17) is tapered, and there is a 'stick fit' between the surface of the tapered recess (11) and the external surface of the lower tapered engagement section (17), and there is no engagement with the sloping transition surface (15).

3 Claims, 1 Drawing Sheet

U.S. PATENT DOCUMENTS

| | | | |
|---|---|---|---|
| 3,273,442 A | 9/1966 | Launay | |
| 3,463,209 A | 8/1969 | Podolsky | |
| 3,584,667 A | 6/1971 | Reiland | |
| 3,888,144 A | 6/1975 | Parsons | |
| 4,084,478 A | 4/1978 | Simmons | |
| 4,258,569 A | 3/1981 | Buchy et al. | |
| 4,258,596 A | 3/1981 | Bisbing et al. | |
| 4,269,246 A | 5/1981 | Larson et al. | |
| 4,325,153 A | 4/1982 | Finnegan | |
| 4,503,737 A | 3/1985 | DiGiovanni | |
| 5,137,407 A | 8/1992 | Yamamoto | |
| 5,171,117 A | 12/1992 | Seidl | |
| 5,279,190 A | 1/1994 | Goss et al. | |
| 5,553,983 A | 9/1996 | Shinjo | |
| 6,016,727 A | 1/2000 | Morgan | |
| 6,017,177 A | 1/2000 | Lanham | |
| 6,253,649 B1 | 7/2001 | Shinjo | |
| 6,419,489 B1 | 7/2002 | Jörnéus et al. | |
| 6,679,141 B1 | 1/2004 | Bozonnet | |
| 6,792,838 B2 | 9/2004 | Brooks et al. | |
| 6,948,408 B1 | 9/2005 | Lee | |
| 6,951,158 B1 | 10/2005 | Edland | |
| 7,147,421 B2 | 12/2006 | Suzuki | |
| 2002/0129680 A1 | 9/2002 | Holland-Letz | |
| 2005/0172761 A1* | 8/2005 | Brooks | 81/439 |
| 2005/0172762 A1 | 8/2005 | Suzuki | |

FOREIGN PATENT DOCUMENTS

| | | |
|---|---|---|
| DE | U-1886754 | 1/1964 |
| DE | 4413782 A1 | 9/1994 |
| DE | 198 36 572 A1 | 4/1999 |
| EP | 0257664 A1 | 3/1998 |
| EP | 0933538 A1 | 8/1999 |
| EP | 0961042 A1 | 12/1999 |
| EP | 1 039 151 A1 | 9/2000 |
| EP | 1230489 B1 | 8/2007 |
| GB | 813571 | 5/1959 |
| GB | 1150382 | 4/1969 |
| GB | 2261483 | 5/1993 |
| GB | 2329947 A | 4/1999 |
| NO | 128968 | 2/1974 |
| TW | 61188 | 9/1984 |
| TW | M271972 | 8/2005 |
| TW | M271974 | 8/2005 |
| TW | M282788 | 12/2005 |

OTHER PUBLICATIONS

United Kingdom Search Report for GB0608062.6, Jun. 2006.
Taiwanese Patent Office, Search Report for Taiwan Invention Patent Application Patent Application No. 2004-549533.
The International Organization for Standardization, ISO 10664, 1999.
DIN 6912, Socket Cap Screw, Mar. 1954.
DIN 6911, Hex Key, Nov. 1966.
Dr. Solf & Zapf, Filing from Opposition Proceeding in EP 1230489 B1, 2008.

* cited by examiner

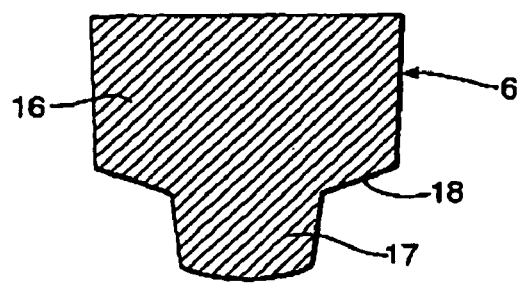
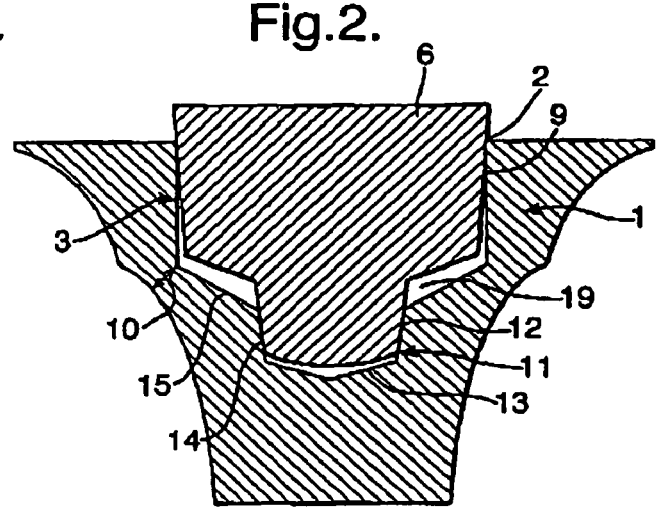
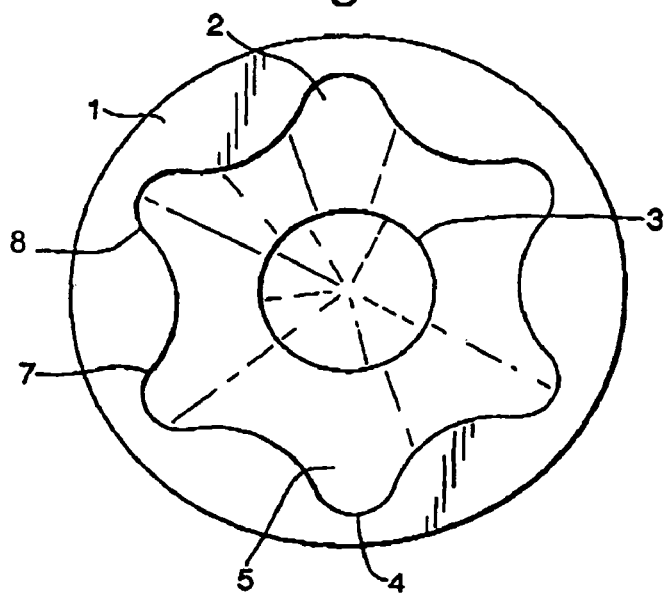

SCREW HEAD AND TOOL FOR USE THEREWITH

RELATED APPLICATIONS

This application is a continuation of U.S. application Ser. No. 11/471,551 filed Jun. 21, 2006, now abandoned, which claims priority of United Kingdom Application No. 0608062.6 filed Apr. 24, 2006.

TECHNICAL FIELD OF THE INVENTION

The invention relates to a screw head having a hexalobular slot in its upper surface, to a tool for use with this screw head, and to a system comprising a screw head and a tool for use therewith.

BACKGROUND TO THE INVENTION

The background to this technology is described in our U.S. Pat. No. 6,951,158, and will not be repeated here. U.S. Pat. No. 6,951,158 showed a tool to engage a screw head. This configuration had advantages in that it restricted the screw from wobbling, and prevented the driving bit from camming out of the screw recess. However, the tool and screw head could not interact so that the screw was 'stick-fit' and retained on the tool without the possibility of falling off. The tool engaged the screw head within a hexalobular slot with surfaces that were directly parallel to each other.

DISCLOSURE OF THE INVENTION

The invention provides a screw head having a hexalobular slot in the upper surface of the screw head, an upper peripheral wall of hexalobular planform extending down into the screw head, the upper peripheral wall being parallel or near parallel to the axis of the screw, a sloping transition surface extending downwardly and inwardly with respect to the lower edge of the upper peripheral wall, and a tapered recess extending downwardly from the lower edge of the sloping transition surface, in which the dimensions of the screw head are such that when the screw head is engaged by a tool having upper and lower engagement sections, the lower engagement section is tapered, and there is a 'stick fit' between the surface of the tapered recess and the external surface of the lower tapered engagement section, and there is no engagement with the sloping transition surface.

It is preferred that the tapered recess is of circular planform.

It is also preferred that there is a close fit at the upper edge of the upper peripheral wall and a loose fit at the lower edge of the upper peripheral wall with upper engagement section.

In another aspect, the invention provides a tool for use with a screw head having a hexalobular slot in its upper surface, and according to the above description, in which the tool has upper and lower engagement sections, and the lower engagement section is of smaller diameter is and tapered downwardly with respect to the axis of the screw to which the tool is to engage, and in which the upper and lower engagement sections are connected with a transition surface which is tapered with a large angle with respect to the axis of the screw.

It is preferred that the upper engagement section is tapered downwardly at an angle with respect to the axis of a screw to which the tool is to engage.

It is further preferred that the upper engagement section is tapered at an angle of 0.1 to 5 degrees.

It is still further preferred that the upper engagement section is tapered at an angle of between 1 and 2 degrees.

In yet another aspect, the invention provides a system comprising a screw head having a hexalobular slot in its upper surface and a tool for use with the screw head, in which in a lower engagement section of the tool, the tool is tapered at the same angle as a recess in the screw, so that the tool can make a 'stick fit' connection with the screw.

It is preferred that there is a transition zone between the upper and lower engagement sections of the tool in which the tool makes no contact with the screw.

It is also preferred that in an upper engagement section of the tool, the tool is tapered at a sharper angle than a peripheral wall of the screw.

BRIEF DESCRIPTION OF THE DRAWINGS

A specific embodiment of the invention will now be described by way of example with reference to the accompanying drawings, in which:—

FIG. 1 is a cross section of a driving tool,

FIG. 2 is a cross section of that tool engaging the head of a screw, and

FIG. 3 is a plan view of the screw head showing the configuration of a slot.

DESCRIPTION OF A SPECIFIC EMBODIMENT

As shown in FIG. 2, a screw head 1 has a slot 2. The slot 2 is formed as a recess 3 in the screw head, and is shaped as a star with six points 4. The points 4 of the star are rounded, as shown in FIG. 3, and the slot 2 is termed a hexalobular slot. Hexalobular slots are described in ISO 10664, and are an internal driving feature. They may be known as 'teeth recesses' or 'star recesses'. Depending on the direction of rotation, a tool 6 (see FIGS. 1 and 2) will engage surfaces 7 or 8 on one side or the other of each point 4.

FIG. 2 shows a cross section through the screw head 1. The recess 3 extends down into the screw head 1. Walls 9 of the recess 3 are approximately straight. The cross section of the recess 3 retains the shape of a star with six points throughout the straight walled part as it extends down into the screw head. The depth of the recess 3 is limited by the minimum allowable wall thickness 10 near the bottom of the recess 3.

The slot 2 has a further recess 11 at the bottom of the six pointed recess 3. The recess 11 is aligned with the axis of the screw, and so is centrally located therein. This central recess 11 has a circular cross section and a smaller diameter than the recess 3. Walls 12 of the recess 11 are slightly inclined, so that the bottom 13 of the recess 11 has a diameter slightly smaller than that of the upper part 14 of the recess 11.

A downwardly straight or sloping transition surface 15 is formed between the upper part 14 of the central recess 11 and the walls 9 of the six-pointed recess 3.

The tool 6 has an engagement section 16 that is designed to fit within the recess 3. The shape of the engagement section 16 in plan complements the shape of the recess 3. However, the diameter of the engagement section 16 may be uniform or slightly tapered inwardly towards its lower end. The taper may typically be 1.5 degrees. The diameter of the engagement section 16 is sized to allow it to be inserted into the recess 3 without difficulties.

The tool 6 also has a central point 17 with a circular cross section. The diameter of the central point 17 is slightly smaller than that of the recess 11. A surface 18 on the tool 6 extends outwardly and upwardly from the central point 17 to the engagement section 16. The angle of inclination of the surface 18 is smaller than that of the transition surface 15. Thus a space 19 is formed between the surfaces 15 and 18 when a tool 6 is inserted into the slot 2. The depth of the space 19 diverges towards the central point 17. The section 16 of the tool 6 may engage the upper periphery of the walls 9 of the recess 3 when the tool enters the slot 2.

Furthermore, in the case of screws which have undergone surface treatment, the diverging space 19 allows any excess coating to collect in the space 19 without obstructing the engagement between the tool and the slot. If no space had been provided, coating residue might settle on the surface 15 and at the bottom 13 of the recess 11, and thereby prevent sufficient engagement between the tool 6 and the slot 2.

Press engagement between the central point 17 and the recess 11, supported by the engagement section 16 of the tool and the upper periphery of the wall 9, ensures that—due to friction—the screw can remain (i.e. 'stick fit') on the tool without falling off. This mode of engagement is particularly effective in reducing angular movement between the tool 6 and the screw head 1. Retention of the screw on the tool by press engagement is particularly useful on one handed power tools and for robotic tools.

The central point 17 may have a length shorter than the height of the recess 3, to enable the engagement section 16 of the tool 6 to enter the recess 3.

ADVANTAGES

The formation of a conical press connection between the tool 6 and the screw head 1 enables the screw to remain on the tool, and not fall off. This advantage is in addition to the feature of our U.S. Pat. No. 6,951,158 that restricted 'wobbling' of the screw. Force fit of the tool 6 onto the screw head 1 keeps the screw head on the tool. The material of the tool 6 is harder than the material of the screw head 1, and this enables the force fit connection to take place.

The invention claimed is:

1. A system comprising:
    a screw head for a screw, the screw head having a hexalobular slot in its upper surface, wherein the screw head further comprises:
        an upper peripheral wall,
        a tapered recess, and
        a sloping transition surface tapered at a larger angle with respect to the axis of the screw than the upper peripheral wall; and
    a tool for use with the screw head, the tool having:
        a lower engagement section,
        an upper engagement section, and
        an angled surface extending between the lower engagement section and the upper engagement section,
        the lower engagement section of the tool being tapered at the same angle as the tapered recess of the screw head, so that the lower engagement section of the tool achieves press engagement to make a stick fit connection with the tapered recess of the screw head,
        the angled surface of the tool being tapered at a smaller angle with respect to the axis of the screw than the sloping transition surface of the screw head such that the angled surface of the tool does not contact the sloping transition surface of the screw head when the lower engagement section of the tool is fully inserted into the tapered recess of the screw head.

2. A system as claimed in claim 1 wherein the upper peripheral wall of the screw head is tapered at a first angle and the upper engagement section is tapered at a second angle, and wherein the second angle is larger than the first angle with respect to the axis of the screw.

3. A system as claimed in claim 1, wherein the tool is formed of a first material and the screw head is formed of a second material, and wherein the first material is harder than the second material.

* * * * *